United States Patent

[11] 3,628,815

[72] Inventor Louis T. King
2901 E. Pierson, Phoenix, Ariz. 85016
[21] Appl. No. 34,407
[22] Filed May 4, 1970
[45] Patented Dec. 21, 1971
Continuation-in-part of application Ser. No. 729,046, May 14, 1968. This application May 4, 1970, Ser. No. 34,407

[54] CONDUIT CONNECTION MEANS
1 Claim, 16 Drawing Figs.

[52] U.S. Cl...................................................... 285/334.4, 285/334.5
[51] Int. Cl...................................................... F16l 19/02
[50] Field of Search............................................ 285/334.2, 334.3, 334.4, 368, 234, 233, 226, 334.5; 277/225, 236

[56] References Cited
UNITED STATES PATENTS
| 198,726 | 12/1877 | Butler | 285/334.5 |
|---|---|---|---|
| 771,682 | 10/1904 | Sussman | 285/334.5 |
| 2,470,508 | 5/1949 | Maky | 285/334.5 X |
| 2,863,678 | 12/1958 | Gordon | 285/334.4 X |
| 3,265,413 | 8/1966 | Currie | 285/334.4 X |
| 3,325,176 | 6/1967 | Latham et al. | 285/334.2 X |

FOREIGN PATENTS
| 400,859 | 12/1942 | Italy | 285/334.5 |
|---|---|---|---|
| 292,513 | 8/1953 | Switzerland | 285/334.2 |

Primary Examiner—Thomas F. Callaghan
Attorney—Drummond, Cahill & Phillips

ABSTRACT: A conduit connection means comprising a pair of hollow structures having opposed conical bore portions, at least one of the hollow structures being a thin wall tubular member having a clamping flange surrounding the same and conforming to an outer wall of the conduit which is conical and substantially conically parallel to said conical bore portion; and a seal ring disposed between said opposed conical bore portions and having a pair of generally conical portions adapted to provide an annular seal ridge serving as a seal pressure concentration area adapted to bear between a respective one of said conical bore portions and conical seal ring portions.

INVENTOR.
LOUIS T. KING

INVENTOR.
LOUIS T. KING

INVENTOR.
LOUIS T. KING

INVENTOR
LOUIS T. KING

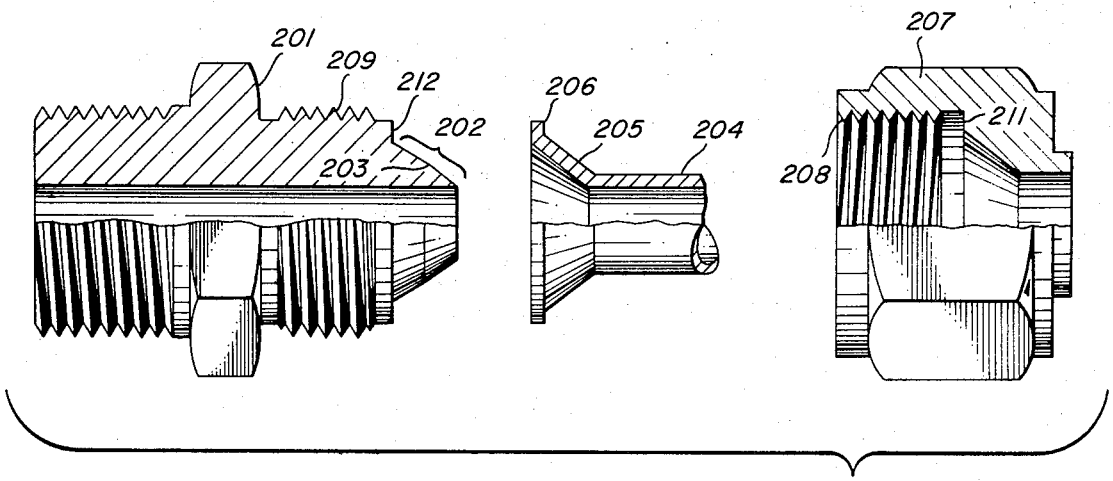
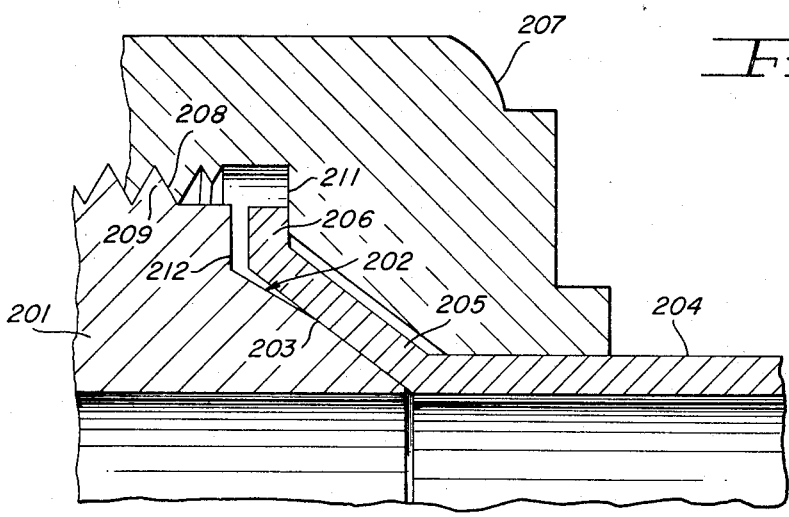
FIG. 14
FIG. 15
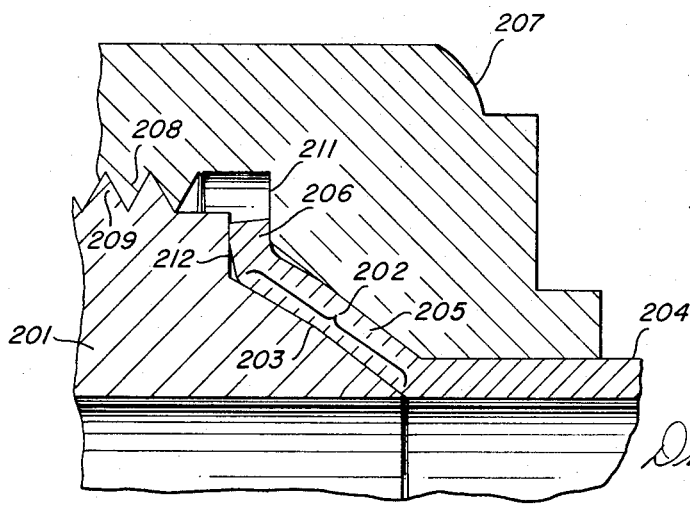
FIG. 16
INVENTOR.
LOUIS T. KING
BY Drummond, Cahill & Phillips
ATTORNEYS

CONDUIT CONNECTION MEANS

This application is a continuation-in-part of my previously filed copending application Ser. No. 729,046 filed May 14, 1968, now U.S. Pat. No. 3,556,568, issued Jan. 19, 1971.

This invention relates to a conduit connection means, and more particularly, to a conduit connection means which is particularly adapted for use in the connection of lightweight conduits which are adapted to operate under conditions of high stress and high temperature, such as may be required in aircraft installations or the like.

Various conduit connection clamps and devices have been used for the purpose of connecting hollow tubular conduits which may be used under highly stressed and/or high-temperature conditions. These prior art devices having, in many instances, employed flange rings welded to adjacent tubular conduits, and the weld areas generally weaken the structure of thin-walled, high-tensile conduits, thereby causing the connection to be weaker than the main body portion of the respective conduit. Many prior art conduit connection means or devices have been relatively complicated, expensive and heavy in proportion to their strength. Additionally, many such prior art conduit connection devices have been quite bulky and difficult to install properly to attain efficient sealing of high-temperature, high-pressure fluids in conduits.

In fluid conduit systems generally found in aircraft, highly stressed structures are generally the rule due to weight and compactness required of such structures, many of the fluid conduits in aircraft are used for air-conditioning purposes, many of the conduits carry high-temperature, high-pressure fluids, such as may be conducted from gas turbines, and in general this class of equipment places very rigorous demands upon conduit connections due to extreme vibration, high-temperatures and pressure and flexural stresses.

Prior art conduit connection devices have generally been weak at the connection flanges or at the areas where the conduit bodies have been welded to flanges or various fixtures which clamp and seal conduits together. Consequently, these areas of fluid conduits have been generally weaker than the bodies of the conduits, thus placing or imposing a great penalty on conduit systems, such as found in aircraft, since the conduits must be of greater weight than necessary to obtain sufficient wall thickness at the weld joint of the connections or couplings to afford a suitable safety factor. Consequently, the entire tubular conduit systems are unduly heavy because of the weakened sections at the joints or connections caused by welding or other similar weakened conditions at the conduit connection areas.

SUMMARY OF THE INVENTION

The present invention employs a very novel and simple conduit connection means having hollow tubular structures at the joints or connections which are equally as strong as the main body of the conduit or conduits being connected or held by the invention.

Specifically, hollow tubular thin-walled conduits are flared into conical end portions which are forced together by generally C-shaped in cross section annular conforming clamping rings which bear on a seal ring provided with conforming conical portions having a plurality of conical sections providing annular seal ridges engaging the conical bore portions of the flared conduit portions, and providing seal concentration areas which may provide very efficient sealing under high-temperature, high-pressure and other highly stressed conditions of the conduits and respective connections.

Additionally, the invention employs a novel seal ring having opposed generally conical seal surfaces adapted to engage opposed conical bore portions of flared conduits, and wherein an annular flange is directed radially outward from the conical seal portions and provides a tension-resisting ring adapted to resist collapsing of the seal ring, and to provide for high-unit loading of the seal ring to attain very efficient sealing, under highly stressed conditions, and with a minimum of leakage.

The present invention includes a novel lightweight bolted assembly comprising a pair of opposed annular C-shaped in cross section clamping rings centered over flared portions of adjacent tubes, and wherein bolts extend through the opposed C-shaped in cross section clamping rings to hold the flared sections of adjacent tubular conduits in seal relation with a sealing ring having opposed conical portions, and wherein the sealing ring is provided with a radially outward directed flange which extends between the flared end portions of the tubular conduits and resist radial stresses tending normally to collapse the sealing ring.

Additionally, the invention employs a sealing ring having novel concentric locator flanges to facilitate concentric assembly of the sealing ring between two flared portions of adjacent conduits connected together by the conduit connection means of the invention.

Further, the present invention provides a free swivel action between the clamping rings thereof and flared conduits being connected so as to allow for desired orientation of clamping bolts in crowded areas to provide freedom in the mating of bolt holes in the clamping rings and to thereby facilitate installation thereof, as desired.

Additionally, the invention includes a novel arrangement of opposed annular generally C-shaped in cross section rings conically abutted to flared portions of axially aligned conduits, said clamping rings being so designed that they may be forced together either by bolts passing therethrough or by an annular generally channel-shaped clamping ring having a single bolt disposed to force opposite ends of the clamping ring together in a wraparound tension relationship to the annular C-shaped in cross section clamping rings of the invention.

Accordingly, it is an object of the present invention to provide a conduit connection means which is particularly adapted for use in connecting conduits in aircraft or in any other installation, wherein such connections are preferably of sheet metal and are lightweight, strong, capable of attaining a seal with minimum leakage, and capable of resisting the effects of a broad range of low and high temperatures, vibrational conditions, and flexural stresses.

Another object of the invention is to provide a very novel and simple conduit connection means employing tubular conduits having opposed flared ends of generally conical shape and having abutment flanges at the end of the conical flared portions, said abutment flanges being engageable by edges of conforming conical portions of generally C-shaped in cross section clamping rings so as to attain maximum tensile strength of the conduit body in, around, and adjacent to the conduit connection means of the invention.

Another object of the invention is to provide a conduit connection means of the invention having novel clamping and sealing structure, including a novel seal ring having a pair of conical sections at different angles which provide for sealing ridges adapted to engage conical bore portions of conduits and to provide concentration pressure areas to effect efficient seals relative thereto.

Another object of the invention is to provide a novel means for extending the length of a conduit connection means in order to compensate for various lengths of conduits being connected in close quarters, such as those found in aircraft, or the like.

Another object of the invention is to provide a novel conduit connection means having very compact and efficient blind threaded nut means for connecting conduits provided with flexural bellows sections and surrounding flexible sheath structures.

Another object of the invention is to provide a conduit connection means having a novel seal ring utilizing a plurality of conical sections forming transitions which provide annular seal ridges adapted to serve as high-pressure seal concentration areas, and whereon metals of different hardness and character may be placed to attain very efficient sealing operations under various environmental conditions.

An additional object of the invention is to provide a conduit connection means having a seal ring adapted to be disposed between a pair of opposed conical bore portions of tubular conduits, and wherein resilient detent means is disposed to engage a radially directed tension flange of the seal ring, and to hold it in assembly with one of the conical bore portions internally of a respective flared portion of a conduit so as to facilitate assembly of the seal ring and the conduit connection means of the invention.

Another object of the invention is to provide a novel conduit connection means having a pair of generally C-shaped in cross section annular clamping rings engaged with generally conical flared portions of respective tubes, such that said annular C-shaped in cross section clamping rings may be clamped together either by bolts extending therethrough or by an annular wedge-type surrounding band having opposite ends forced together by a single bolt.

Another object of the invention is to provide a novel conduit connection means wherein a minimum area at the connection joint of the invention is exposed to pressure which normally tends to force the joint apart.

Further objects and advantages of the invention may be apparent from the following specification, appended claims, and accompanying drawings:

BRIEF DESCRIPTION OF THE DRAWINGS

FIGS. 14, 15 and 16 depict, in partial sectional views, another embodiment of the invention wherein the sealing ring is integrally formed in a fluid system component, in this case, the male body member of a tube-coupling joint.

DESCRIPTION OF THE PREFERRED EMBODIMENTS

Figure 1:
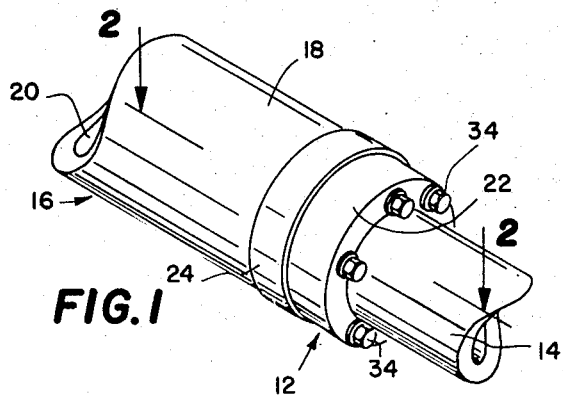
FIG. 1 is a fragmentary perspective view of a pair of conduits, including one substantially rigid conduit, and one substantially flexible bellows-type conduit with a covering sheath, and showing the conduit connection means of the invention connecting said conduits.
Figure 2:
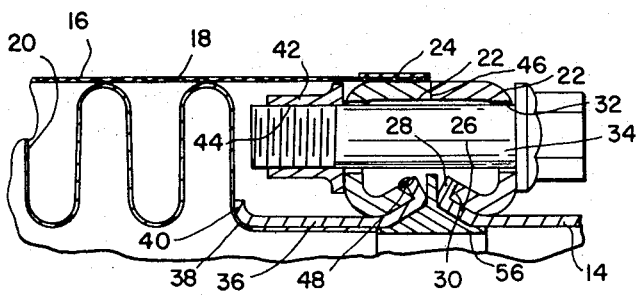
FIG. 2 is a fragmentary sectional view taken from the line 2—2 of FIG. 1.

As shown in FIG. 1 of the drawings, a conduit connection means of the present invention is generally indicated at 12 and is used to connect a substantially rigid hollow tubular conduit 14, and a second conduit 16 composed of an outer flexible sheath 18 and an inner flexible bellows structure 20. The sheath 18 is generally a woven structure and the bellows is a resilient sheet metal bellows in generally tubular form. FIG. 2 discloses only one sidewall structure of the conduits 14 and 16, and an annular cross section of the conduit connection means of the invention.

The invention comprises a pair of opposed annular generally C-shaped in cross section clamping rings 22. The flexible sheath 18 is secured on one of these clamping rings 22 by means of a surrounding band 24. The conduit 14 is provided with a hollow tubular conical portion 26 at its one end, this portion 26 being generally conically flared portion provided with an integral annular abutment flange 28 with which an edge 30 of a generally C-shaped in cross section annular clamping ring 22 is abutted. This ring 22 is provided with openings 32 through which bolts 34 extend. The other one of the clamping rings 22 is secured to a hollow tubular member 36 in a similar manner to the connection with the hollow tubular member 14, and secured to this member 36 is a hollow cylindrical portion 38 of the bellows 20. The tubular conduit portion 36 is provided with a flared end 40 conforming with a portion of the first convolution of the bellows 20, and a nut plate 42 is fixed to one of the clamping rings 22, as shown best in FIG. 2 of the drawings. This clamping plate 42 is annular and may be welded or otherwise secured to the respective clamping plate 22. The nut plate 42 is provided with internally screw-threaded portions 44 into which the bolts 34 are screw threadably connected to force the clamping rings 22 together. The clamping rings 22 are provided with abutting edges 46 at the perimeter of the conduit connection means of the invention. Thus, the bolts 34, when threaded into the blind nut plate 42 and when tightened, force the clamping rings 22 together and force the end portions thereof into firm abutment with the abutment flange portion 28.

The abutment flange portion of the conduit portion 36 is welded at 48 to secure the bellows conduit in connection with the respective clamping ring 22.

Figure 3:
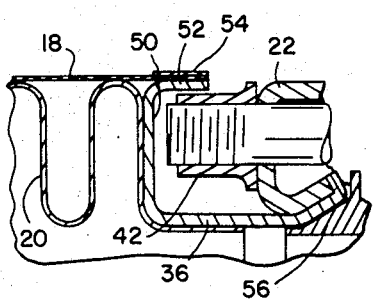
FIG. 3 is a fragmentary sectional view similar to FIG. 2, but showing a modification of the structure shown in FIG. 2.

As shown in FIG. 3, the conduit portion 36 is provided with a generally annular C-shaped ring portion 50 which is integral therewith, this portion 50 having an annular surrounding portion 52 to which the sheath 18 is connected by means of a surrounding ring 54, thus alleviating the necessity of mounting the flexible sheath 18 on the outside of one of the clamping rings 22, as shown in FIG. 2 of the drawings.

In the structure shown in FIGS. 2 and 3 of the drawings, tightening of the bolts 34 automatically applies tension to the sheath 18 which may be calibrated in proportion to the amount of axial movement of the respective clamping rings 22 while the clamping ring 22 is being forced axially into a sealed disposition, as shown in FIGS. 2 and 3 of the drawings.

Disposed between the flared or conical bore portions of the conduit portions 14 and 36 is a sealing ring 56 against which the conical bore portions of the conduits are clamped to provide an efficient seal. A cross section of this sealing ring is shown in detail in FIG. 4 of the drawings, and also is shown in relation to structures disclosed in FIGS. 5, 6, 7, 8 and 10.

For the sake of clarity in describing this sealing ring, reference is made to these additional FIGS. since they show the sealing ring on somewhat larger scale than that shown in FIGS. 2 and 3 of the drawings. Additionally, the flared portions of the conduits coupled by the conduit connection means of the invention are shown on larger scale in FIGS. 5, 6, 7 and 10 of the drawings, so as to clearly disclose a mechanical and sealing relation between annular C-shaped in cross section clamping rings of the invention and the seal ring thereof.

Figure 5:
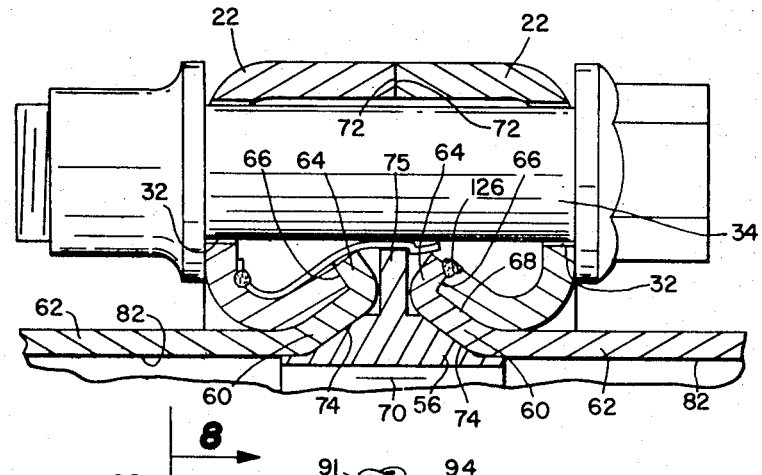
FIG. 5 is a view similar to FIG. 2, but showing the conduit connection means of the invention connecting two substantially similar hollow thin-walled tubular conduits.

Reference is now made specifically to FIG. 5 of the drawings, wherein a pair of the C-shaped in cross section annular sealing rings 22 are engaged with conically flared portions 60 of hollow tubular conduits 62. The conically flared portions 60 being similar to the portion 26, hereinbefore described in connection with FIG. 2 of the drawings. Each conically flared portion 60 is provided with an annular abutment flange portion 64 integral therewith and disposed substantially at right angles to the conical angle of each flared portion 60 and generally directed diametrically upward so as to form an axial abutment for an edge lip 66 of a respective clamping ring 22. Each conically shaped flared portion 60 is provided with an outer conical wall 68 against which a conforming conical portion of the respective clamping ring 22 is engaged, all as shown best in FIG. 5 of the drawings. Reference is now made to arrows 70 in FIG. 5 of the drawings, which are parallel to the central or longitudinal axis of the substantially aligned hollow tubular conduits 62, and in an axial direction, as indicated by arrows 70, the abutment flanges 64 are spaced apart as are the abutment edges 66 of the clamping rings 22.

Figure 4:
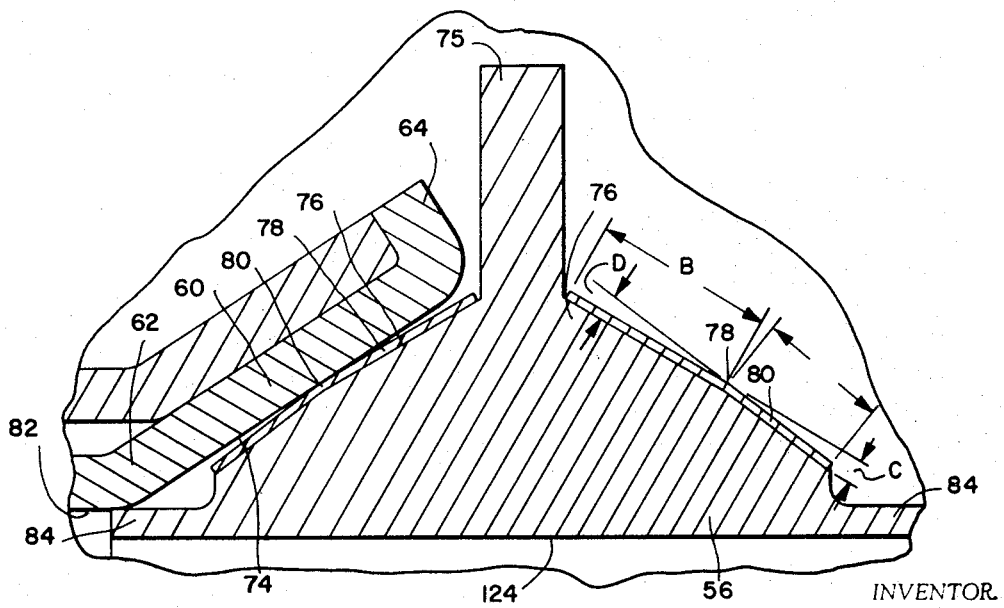
FIG. 4 is an enlarged fragmentary sectional view of a cross section of the sealing ring structure of the conduit connection means of the invention.

Radially outermost edges 72 of the C-shaped in cross section clamping rings 22 are abutted in opposed relation to each other, as shown in FIG. 5, while the abutment ledges 64 are spaced apart as are the engaging edges 66 of the clamping rings 22. The hereinbefore described bolts 34 extending through the openings 32 in the clamping rings 22 force the edges 72 into abutted relation with each other and force conical bore surface portions 72 of the flared portions 60 into contact with the sealing ring 56 of the invention. This sealing ring 56 is provided with a radially outwardly directed flange 76 adapted to resist tension normally to prevent radial collapsing of the sealing ring 56 when under angular compression induced by forcing the surfaces 74 together on complemental surfaces of the sealing ring 56. It will be seen that the outwardly directed radial flange 76 extends between the abutment flanges 64, and that when they are tightened toward each other, they do not abut the flange 76, but bear on generally conical portions 76 of the sealing ring 56, as shown in detail in FIG. 4 of the drawings. Each generally conical portion 76 is provided with two sections A and B. The section A being disposed at a conical angle C, and the section B being disposed at a conical angle D, as shown in FIG. 4 of the drawings, providing an annular ridge 78 which serves as a seal pressure concentration area in engagement with a respective conical bore portion 74 of a respective conically flared portion 60, as hereinbefore described.

Each conical portion 76 of the seal ring 56 may be coated with a layer of relatively soft metal 80 which is capable of providing an efficient slightly compressible seal area adjacent each conical bore portion 74 due to the limited area of each ridge 78 over which the layer of metal 80 extends.

It will be understood that this layer of material 80 may be other than metal, if desired, as for example, some of the temperature resisting elastic materials may be used. This, of course, will depend on the environmental conditions under which the seal ring is adapted to be employed.

Each conduit 62 is provided with a substantially straight axial bore portion 82 parallel to the longitudinal axis line 70, shown in FIG. 5 of the drawings.

Extending from each generally conical seal portion 76 of the seal ring 56 is a cylindrical flange 84 serving as a concentric locating flange and engageable with the inner side of the respective straight bore 82, the flange 84 being a thin flange serving only to provide for initial concentric alignment of the sealing ring 56 with the conically flared portions 60 of the hollow tubular conduit 62 during assembly of the conduit connection means of the invention.

Figure 6:
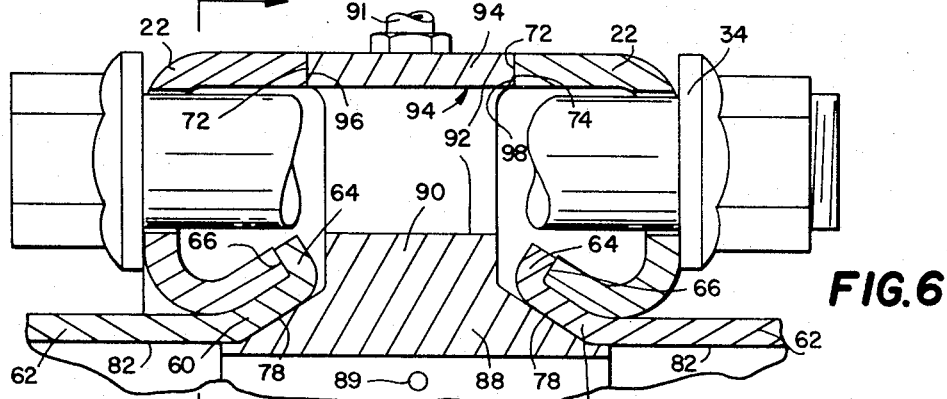
FIG. 6 is a view similar to FIG. 5, but showing an elongated sealing ring of the invention adapted to provide spacer for compensating for the length of conduits being connected or longitudinal discrepancies therein.

In the modification of the invention, as shown in FIG. 6 of the drawings, the seal ring is designated 88. This modified seal ring 88 is similar is respect to the structure disclosed in FIG. 4, however, the radially outward extending flange of the seal is designated 90 which corresponds structurally to the flange 75. This flange 90, shown in FIG. 8, is provided with openings 92 through which the clamping bolts 34 extend.

The perimeter of the flange 90 is provided with a spacer ring 94 which forms an abutment of opposed portions of the C-shaped in cross section annular clamping rings 22. It will be seen that the spacer portion 94 is provided with opposite edges 96 and 98 to which respective portions of the clamping rings 22 are abutted, while the breadth of the flange portion 90 is substantially less than the distance between the edges 96 and 98 of the portion 94 to provide clamping clearance for the opposed abutment flange portions 64, as hereinbefore described.

Figure 8:
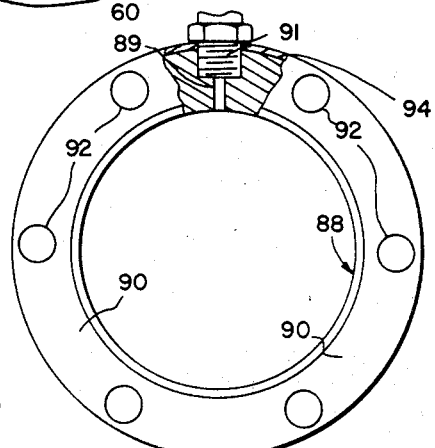
FIG. 8 is a sectional view taken generally on the plan of line 8—8 of FIG. 6, showing a sealing ring of the invention on reduced scale and showing the circular form thereof.

As shown in FIG. 8, it will be seen that the modified seal ring 88 of the invention is circular as is the hereinbefore described seal ring 75.

The distance between opposite abutment edges 96 and 98 of the portion 94 of the seal ring 88 may vary in accordance with the desired adapter length in order to compensate for or to fit a space between the flared ends of the conduits or hollow tubular members 62. Thus, the invention may provide for discrepancies in the length of the hollow tubular conduits 62, and thereby permit repair of one of the flared portions 60 following which a substantially longer seal ring 88 may be inserted between the flared portions 60 and between adjacent abutment edges 72 of the C-shaped in cross section annular clamping rings 22.

Figure 9:
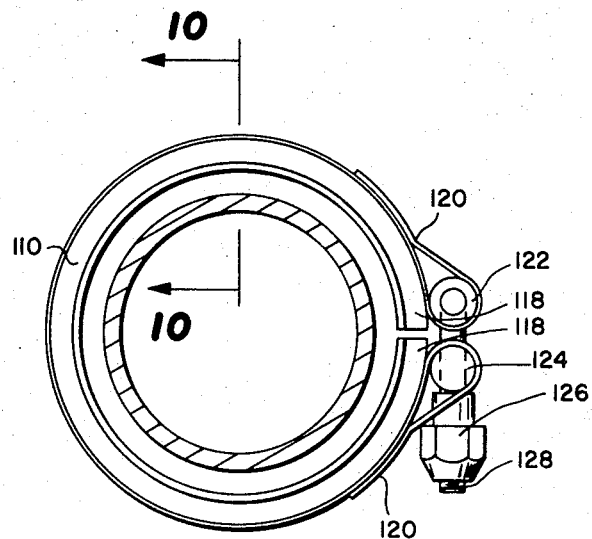
FIG. 9 is a cross-sectional view of a conduit structure showing the conduit connection means of the present invention thereon and illustrating a band-type wedge clamp for holding the generally C-shaped in cross section annular clamping members of the invention together.

As shown in FIGS. 8 and 9, the seal ring 88 may have a radial passage 89 communicating with an externally screw-threaded connection 91 so as to provide communication through the sidewall of the seal ring 88 to afford facilities for the connection of pneumatic instrumentation, or the like, to provide for other fluid conduction facilities, as desired.

Figure 7:
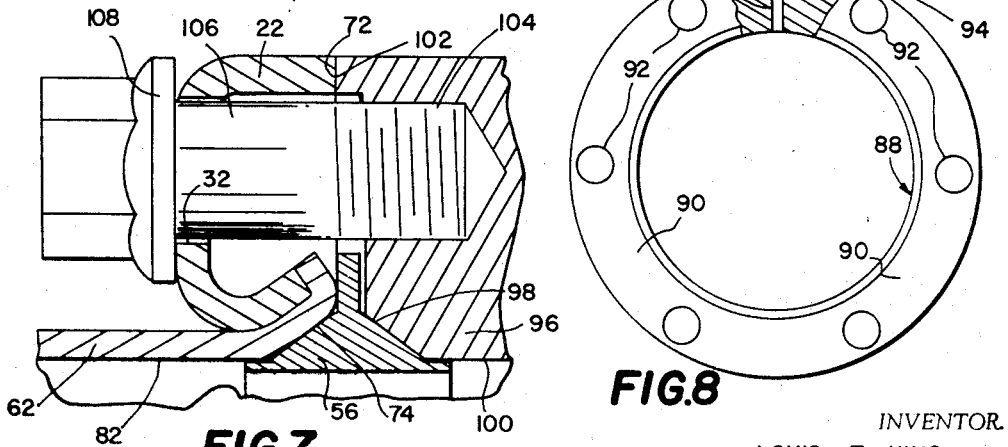
FIG. 7 is a view similar to FIG. 5, but showing a conduit being connected to the bore portion of a casting or housing by means of the conduit connection of the invention.

In the modification, as shown in FIG. 7, one hollow tubular member 62 is coupled to a housing, such as a pump casting, or the like, said housing being designated 96, and in accordance with the invention, constituting a hollow tubular member having a conical bore portion 98 equivalent to the conical portions 74 of the hollow tubular members 62, hereinbefore described. The hollow housing structure 96 is provided with a bore 100 continuing from the conically shaped bore portion 98 thereof, and this conically shaped bore portion 98 is engageable with the structure of a sealing ring 56 similar to that as disclosed in FIG. 4 of the drawings. An abutment edge 72 of the clamping ring 22, shown in FIG. 7, abuts a shoulder 102 of the housing or casting 96, and an internally screw threaded bore 104 therein receives a threaded portion of a capscrew 106 which is provided with a head 108 bearing on the outer side of the respective clamping ring 22, the bolt being extended through an opening 32 in the respective clamping ring 22.

It will therefore be appreciated that as a hollow tubular structure, the bore portion 100 forms a continuity of a respective bore portion 82 of the clamping ring 22, shown in FIG. 7.

Figure 10:
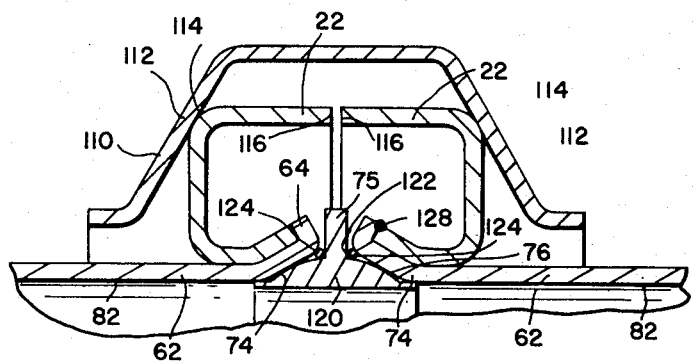
FIG. 10 is an enlarged fragmentary sectional view taken from the line 10—10 of FIG. 9.

As shown in FIGS. 9 and 10 of the drawings, a channel shaped in cross section one-piece annular clamping band 110 surrounds a pair of the clamping rings 22 of the invention. The band 110 is provided with a cross-sectional shape having inwardly diverging channel wall portions 112 bearing on curved corners 114 at the peripheries of the clamping ring 22. The clamping rings 22 in the modification, as shown in FIG. 10, are provided with edges 116 which are spaced apart and are not abutted as are the corresponding edges 72 of the structure shown in FIG. 5, for example. Otherwise, the clamping rings 22 are similar to those hereinbefore described.

Opposite ends 118 of the band 110 are connected by metal loops 120 to bolt-holding fixtures 122 and 124 which are substantially conventional and to which a screw-threaded nut 126 is disposed and screw threadably engaged with a screw-threaded bolt portion 128. The bolt portion 128 being held by the fixture 122 and passing through the fixture 124 so as to permit abutment passing of the nut relative to the fixture 124 and to force opposite ends of the band 110 together creating peripheral compressive forces on the curved peripheral corners of the clamping rings 22, and thus forcing them toward each other to hold the conically flared portions 74 in engagement with the respective sealing ring 120. This sealing ring 120 is similar to the sealing ring 56, hereinbefore described, but is additionally provided with a pair of recesses 122 in which elastic seal rings 124 are disposed. These sealing rings 124 may be made of heat-resistant elastic material or soft wire, and are disposed at a transition between the respective conical portions 76, and the tension resisting flange 75 thereof. The sealing rings 124 are engaged by the conically flared or conical bore portions 74 and thus may form a very efficient fluid tight seal.

The sealing rings 56, 88 and 120 described herein, all employ thin centering or locating flanges 84, as shown in FIG. 4 of the drawings, and thus each sealing ring 56 and equivalents thereof, according to the invention, is provided with a bore 124, as shown in FIG. 4 of the drawings. This bore being very little smaller than the respective straight bore portions 82 of the hollow tubular members 62.

It will be appreciated by those skilled in the art that the C-shaped in cross section annular clamping rings 22 which conform to and engage the conically flared portions 74 place the entire cross section of each hollow tubular member 82 in tension and in shear due to the disposition of the conically flared portions engaged with the conforming conical portions of the seal ring 124.

The abutment flange 64 abutting edges 66 of the clamping rings 22 provided for complete axial shear loading of the entire cross section of the respective hollow tubular member of its ultimate strength, and since there is a complete absence of welding at a location beyond opposite ends of the respective sealing rings 56, the structure of the invention is sound as compared to those conduit connections having butted or overlapped welded flange connections. The clamping rings 22 may be rotated on the flared portions 74 of the hollow tubular conduits 62 so as to dispose the disposition of the bolts 34 at desired locations, however, the edge portions 66 of the clamping rings 22 may be welded to respective abutment flanges 64, as indicated at 126 in FIG. 5 of the drawings, and 128 in FIG. 10 of the drawings, this being optional not for the purpose of added shear strength of the structure and/or for the purpose of positively locating a respective sealing ring 22 on the given hollow tubular member 62 in order to predetermine locations of the bolts 34.

Figure 11:
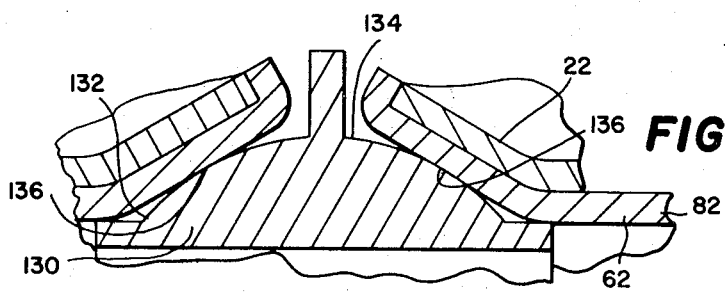
FIG. 11 is a sectional view similar to FIG. 4, showing a further modification of the invention.

As shown in FIG. 11, a seal ring 130 is similar to the seal ring 56, however, this seal ring 130 is provided with a pair of generally conical portions 132 and 134. The specific geometry of these generally conical portions being spherical to provide annular sealing pressure concentration ridges 136 similar to the ridges 78, hereinbefore described. Accordingly, it will be obvious to those skilled in the art that the generally conical portions 132 and 134 may be equivalent to the generally conical portions of the sealing ring structures shown in FIG. 4 of the drawings, and that the ridges 136 may perform substantially the same function as the ridges 78 described in connection with the seal rings 56.

Figure 12:
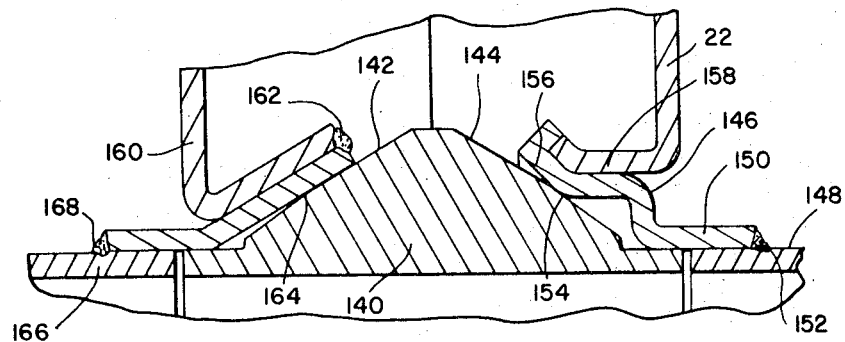
FIG. 12 is another view similar to FIG. 4, showing additional modifications of the present invention.

In the modification, as shown in FIG. 12 of the drawings, a seal ring 140 is similar to the hereinbefore described seal rings 56 and 130. However, this seal ring 140 is provided with straight generally conical seal ring portions 142 and 144 engaging the conical seal ring 144 is a generally conically shaped flared annular structure 146 which is connected to a hollow tubular conduit 148. The flared structure 146 is provided with a collar portion 150 surrounding and overlapping the conduit 148 and is welded thereto at 152.

This is an optional manner of connecting the flared structure to the conduit 148 and may, in some instances, be desirable in accordance with the present invention. However, the invention is not limited to the welded connection of the flared portion 146 with the conduit 148 since the flared conical structure 146 includes a novel pressure concentration sealing ridge 154 adapted to bear on the generally straight conical portion 144, the sealing 140. The portion 154 of the flared generally conical portion 146 is provided by means of an intersection of two conical portions 156 and 158 of the flared portion 146 being of different conical angles similar to the general concept of the different conical angles of the conical sections described in connection with the sealing ring 56, shown in FIG. 4 of the drawings. Accordingly, it will be seen that the concentration pressure sealing ridge 154 is equivalent to the ridge 78, but is on the flared tubular portion rather than being on the sealing ring of the invention.

Additionally, it will be appreciated that a further modification, shown in FIG. 12, comprises one of the clamping rings similar to the clamping rings 22. This specific clamping ring being designated 160 having its edge welded at 162 to a complemental edge of a straight conical flared portion 164 welded to a tubular conduit 166 at 168.

Figure 13:
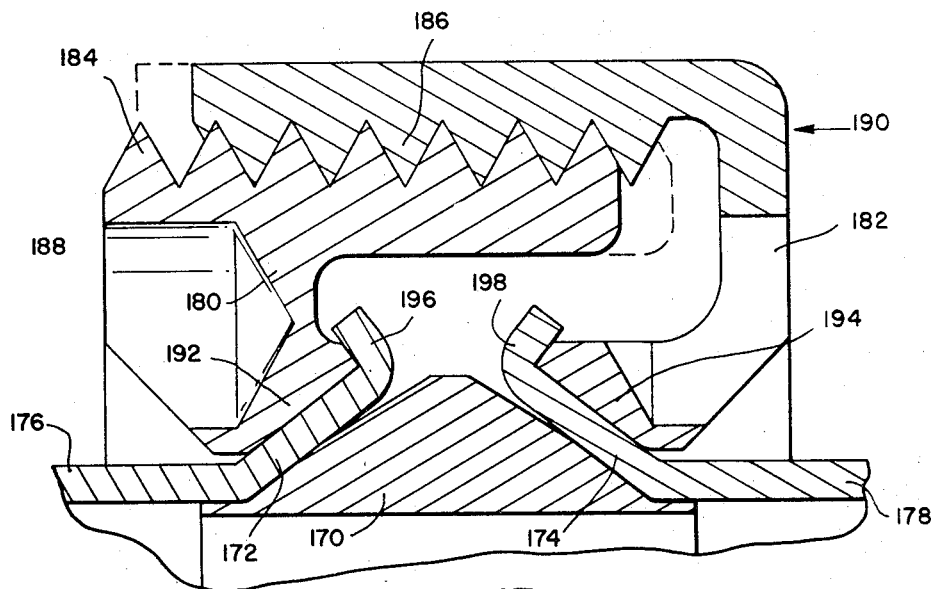
FIG. 13 is an enlarged fragmentary sectional view similar to FIGS. 5 and 6, and showing an additional modification of the invention.

In the modification of the invention as shown in FIG. 13, a sealing ring 170 which may be similar to the sealing ring 56 is engaged by flared portions 172 and 174 of hollow tubular conduits 176 and 178, respectively. These flared portions 172 and 174 are engaged by respective screw-threaded nut members 180 and 182. The screw-threaded nut members 180 and 182 annular and of a cross section, as shown in FIG. 13. The nut member 180 is provided with external screw threads 184 which mesh with internal screw threads 186 of the nut member 182 so that the nut members 180 and 182 may be screw threadably advanced toward each other in the directions of the arrows 188 and 190, respectively, so that flange engaging portions 192 and 194 of the respective nut members 180 and 182 may be forced toward each other into engagement with respective conduit flared conical portions 172 and 174, hereinbefore described. It will be seen that portions 192 and 194 of the screw-threaded nut members 180 and 182 are conically conforming with the generally conical flared portions 172 and 174, and are engageable with respective abutment flange portions 196 and 198 of the conical flared portions 172 and 174. These abutment flange portions 196 and 198 being similar to the hereinbefore described abutment flange portions 64, as shown in FIG. 5 of the drawings.

It will be appreciated by those skilled in the art that the portions 192 and 194 are located on the respective flared portions 172 and 174 in order to permit relative screw-threaded advancement of the screw-threaded nut members 180 and 182, as hereinbefore described. It will be appreciated by those skilled in the art that the screw-threaded nut members 180 and 182 may be provided with spanner wrench engaging surfaces or may be provided with spanner wrench engaging recesses well known to those skilled in the art.

FIGS. 14, 15 and 16 illustrate yet another embodiment of the invention in which the sealing ring is integrally formed in the male member of a tubing coupling joint. As shown in FIG. 14, the male member 201 is provided with an inwardly tapering sealing surface 202. The inwardly tapering surface 202 is provided with a seal ridge 203 formed by the intersection of conical portions of the sealing surface 202 having different conical angles as previously described in connection with FIG. 4. The end of the tubing 204 is provided with an outwardly flared portion 205 terminating in a peripheral abutment flange 206. The tubing coupling joint is made up by screwing the female coupling nut 207 having internal threads 208 onto the external threads 209 of the male member 201.

As shown in FIG. 15, as the nut 207 is advanced onto the male member 201, an internal shoulder 211 contacts the face of the peripheral abutment flange 206, causing the outwardly flared portion 205 of the tubing 204 to sealingly engage the sealing surface 202 of the male member 201 at the annular seal ridge 203.

As shown in FIG. 16, further advancement of the nut 207 onto the threads 209 of the male member 201 deforms the flared portion 205 of the tubing 204 slightly and causes the abutment flange 206 to be secured between the face of the internal shoulder 211 of the coupling nut 207 and the annular shoulder 212 of the male member 201. When so secured, the flared portion 205 of the tubing 204 is securely held and sealingly engaged with the seal ridge 203 of the sealing surface 202.

It will be obvious to those skilled in the art that various modifications of the present invention may be resorted to in a manner limited only by a just interpretation of the following claims.

I claim:

1. A thin-wall tubing connection assembly especially adapted for use in aircraft fluid conduit systems, said connection assembly comprising, in combination:
   a. a thin-wall tubing member having an outwardly conically flared substantially flat sealing surface formed integrally internally in an end of said tubing and an outer conically flared surface;
   b. an externally threaded male coupling member having a fluid-conducting bore in communicative alignment with the bore of said thin-wall tubing;
   c. an inwardly tapering sealing surface formed integrally on the end of said male coupling member opposed said tubing member, said inwardly tapering surface being shaped to generally register with the outwardly flared sealing surface formed in the opposed end of said thin-wall tubing;
   d. an annular seal ridge formed on said inwardly tapering surface intermediate the edges thereof, said seal ridge being formed by the intersection of conical portions of said inwardly tapering surface having different conical angles;
   e. a peripheral abutment flange formed integrally in the end of said outwardly flared tubing and extending radially outwardly therefrom; and
   f. an internally threaded coupling nut having an annular internal shoulder adapted to engage said peripheral abutment flange and said outer conically flared surface, forcing said conically flared sealing surface in the end of said tubing member into sealing engagement with one of said conical portions and said annular seal ridge when said coupling nut is threadedly engaged upon said male coupling member whereby further advancement of the coupling nut on the male coupling member deforms a portion of said outwardly flared tubing into engagement with the other of said conical portions.

* * * * *